Feb. 13, 1968    D. E. HARRISON ETAL    3,368,391
VISCOSITY MEASURING APPARATUS
Filed May 17, 1965    6 Sheets-Sheet 1

INVENTORS
Don E. Harrison
& Robert B. Gosser
BY
Hyman Hirmond
ATTORNEY

Feb. 13, 1968   D. E. HARRISON ET AL   3,368,391
VISCOSITY MEASURING APPARATUS

Filed May 17, 1965   6 Sheets-Sheet 3

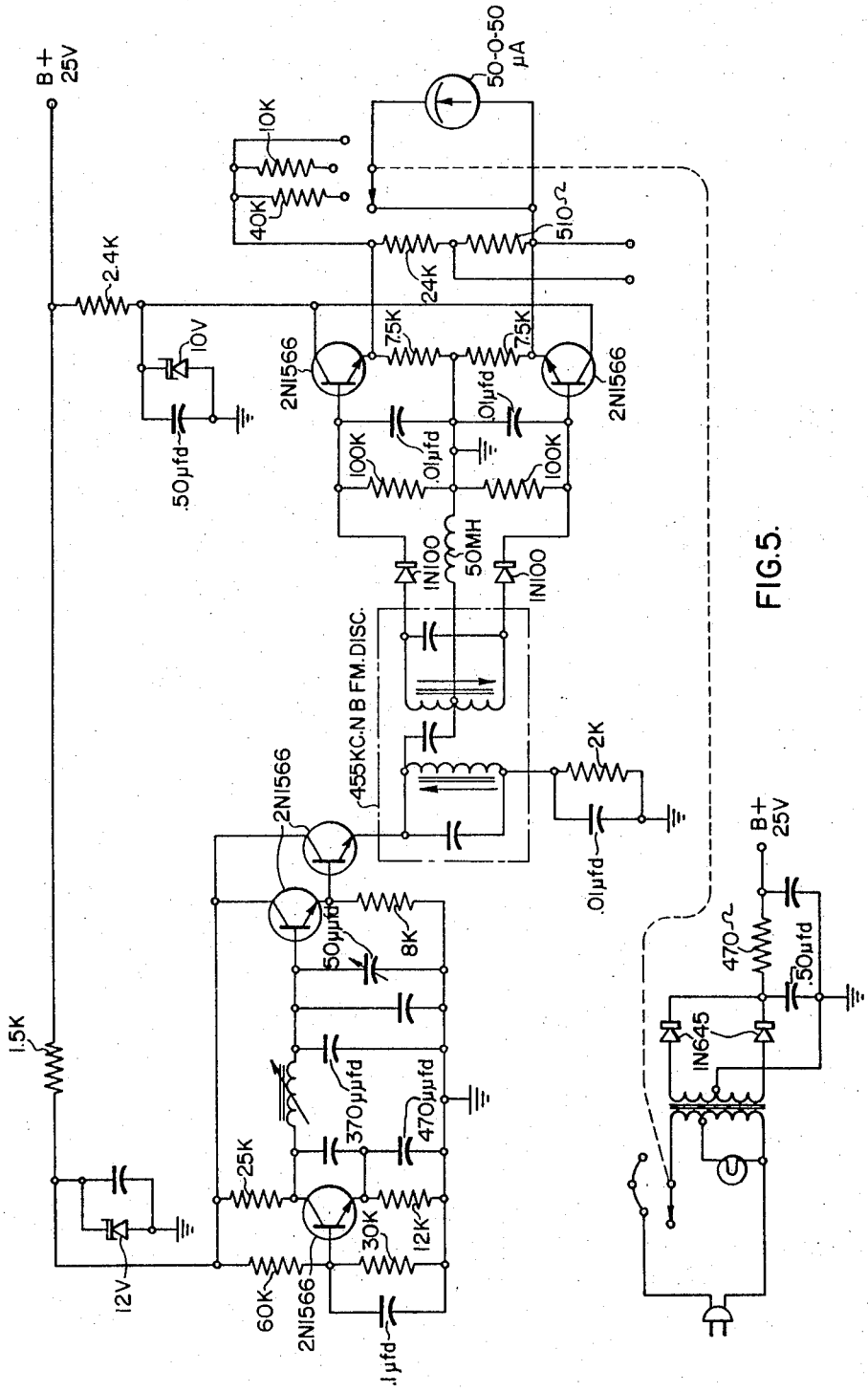

United States Patent Office 3,368,391
Patented Feb. 13, 1968

3,368,391
VISCOSITY MEASURING APPARATUS
Don E. Harrison, Pittsburgh, and Robert B. Gosser, Manor, Pa., assignors to Westinghouse Electric Corporation, Pittsburgh, Pa., a corporation of Pennsylvania
Filed May 17, 1965, Ser. No. 456,230
12 Claims. (Cl. 73—57)

ABSTRACT OF THE DISCLOSURE

A viscometer has a tube containing a liquid under pressure through which a ball is permitted to fall. At two points along the path of fall the ball varies the capacity in circuit with an FM indicator. An indication of one polarity indicates passage of the ball. A bubble produces an indication of opposite polarity.

---

The invention relates to viscosity measuring apparatus or viscometers and has particular relationship to viscometers for measuring viscosity at high pressures and high temperatures. Typically the pressure at which it is desired to measure the viscosity may be as high as 5 kilobars and the temperature as high as 400° C.

Viscometers in accordance with the teachings of the prior art are typically of the so-called rolling-ball type. In such viscometers a ball or other object rolls or moves, under gravity at substantially constant velocity, along an inclination between two points in the medium whose viscosity is to be measured and the viscosity is determined from the time taken by the object to move between the two points. The viscosity is proportional to the time taken by the object to move between the two points and may be derived from the equation $$\eta = A(\rho_b - \rho_1)\tau$$

In this equation A is a constant depending on the geometry of the apparatus, $\rho_b$ is the density of the ball, $\rho_1$ is the density of the liquid and $\tau$ is the time of movement. The constant A is usually derived by calibrating the viscometer against a liquid of known viscosity.

The rolling-ball viscometers in accordance with the teachings of the prior art has not operated satisfactorily to measure viscosity of liquids under substantial pressure and at high temperatures. It is an object of this invention to provide a high precision viscometer for measuring the viscosity of a fluid under high pressures.

This invention arises from the realization or discovery that in measuring viscosity at high pressures it is essential to couple the liquid whose viscosity is being measured, to the fluid which supplies the pressure during the measurement so that the pressure is transmitted effectively and does not change during the measurement. It has also been realized that the precise determination of viscosity requires that the time of movement of the moving object between the two points must be precisely measured. In the practice of this invention the medium whose viscosity is to be measured is disposed in a tube within a bomb capable of withstanding the pressure. The moving object is movable through the medium in this tube. In accordance with this invention the pressure is applied to the medium through a capillary constriction interposed in this tube between the movable object and the source of the pressure. The pressure is effectively transmitted through the capillary but the capillary prevents the medium from flowing from the tube as the tube is moved or turned to impress gravity force on the moving object. The tube with its capillary and the movable object constitute a viscometer cell. Also in accordance with this invention the time of movement of the object is measured precisely by a frequency-modulation (FM) indicator which is electrically coupled to the cell in which the object moves. The FM indicator includes an oscillator having frequency-determining impedance components in the cell in the path of the moving object.

Typically the tube of the cell is pivotal between two different angular settings in each of which the moving object moves between interchangeable upper and lower positions. The impedance components are interposed between these positions so that the object passes these impedance components successively in its movement between the two positions. While the object is nearest each impedance component it sharply changes its impedance changing the frequency of the oscillator. The FM indicator is provided with a frequency discriminator and is set so that it indicates these changes in frequency. The discriminator supplies signals to an indicator which indicates the time that elapses between changes in frequency and thus the time of movement of the object from one impedance component to the other.

An important aspect of this invention is the use of capacitive impedance components rather than inductive components in the path of the moving object. The measurement of viscosity then depends on the changes in the capacity of the capacitive components as the moving object passes through these components and this in turn depends on the relationship between the dielectric properties of the medium and the dielectric properties of the moving object. Typically, the medium is a liquid which may have a dielectric constant substantially higher than one. The moving object may be composed of non-electrically conducting material but must have a substantially different dielectric constant than the medium which may be either higher or lower than the dielectric constant of the medium. With the dielectric constant of the object and the medium unequal the relationship between these dielectric constants affects the polarity of the indication produced. The oscillator is such that an increase in capacitance produces a decrease in frequency. The movement of an object of a higher dielectric constant than the medium through the capacitive components then produces instantaneous decrease in the frequency of the output of the oscillator and with the moving object of a lower dielectric constant than the liquid, the movement of the object through the capacitive components produces an increase in this frequency. In either case the discriminator would produce a signal of one polarity for an object having a higher dielectric constant than the medium and a signal of the opposite polarity for an object having a lower dielectric constant than the liquid. In the practice of this invention the moving object may also be of a conducting material and in this case the effect of the object moving through the capacitive components is to increase the capacity.

In the measurement of viscosity of most typical liquids it is highly desirable that the moving body be a conductor or have a dielectric constant higher than that of the liquid. Such a relationship has the advantage that the signals produced by the body passing through the capacitive components may be distinguished from signals produced by bubbles passing through the capacitive components. A bubble includes a gas which has a dielectric constant of about one. For most liquids this would produce a decrease in capacity and a signal having opposite polarity to that produced by the moving object. The presence of bubbles could thus be detected and the bubbles eliminated together with the disturbing influence which they have on the measurement.

The novel features considered charactesistic of this invention are disclosed generally above. For a better understanding of this invention, both as to its organization and as to its method of operation, together with additional objects and advantages thereof, reference is made to the following description taken in connection with the accompanying drawings, in which:

FIG. 5 is a schematic similar to FIG. 4, included for the purpose of aiding those skilled in the art in practicing this invention and not with the intention of in any way restricting the scope of this invention, showing the component magnitudes of an FM Indicator used in the practice of this invention and found to operate highly satisfactorily.

Figure 1:
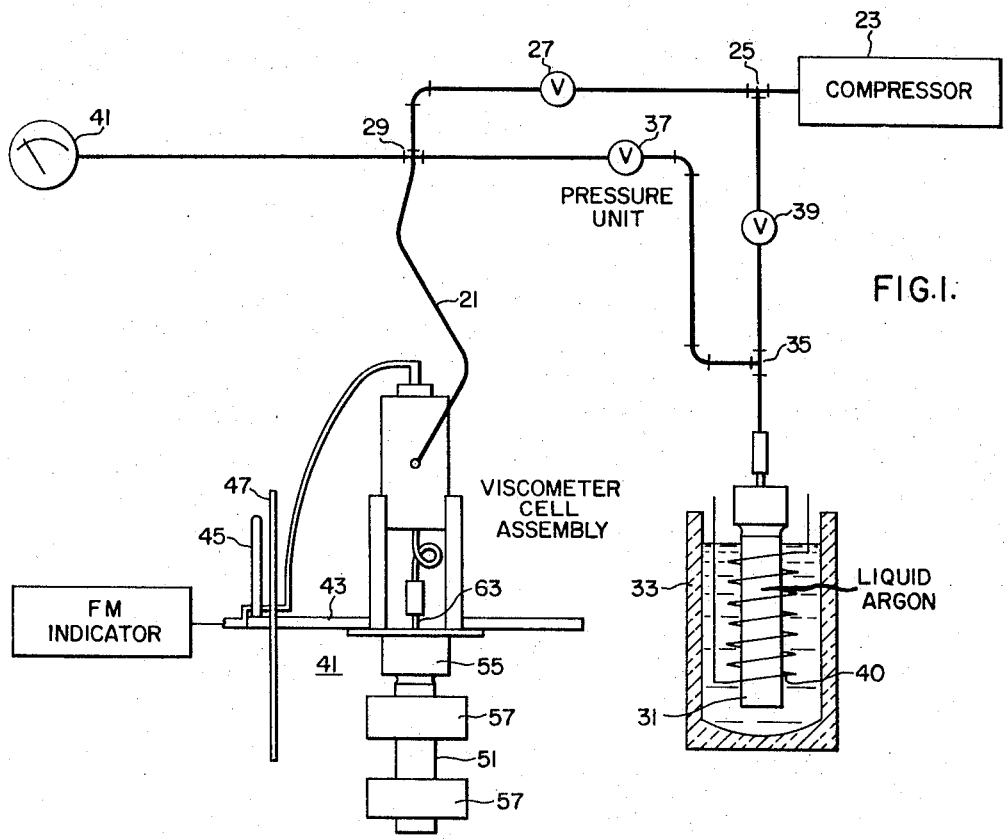
FIGURE 1 is a view generally diagrammatic showing an embodiment of this invention.

The apparatus according to this invention includes a Viscometer Cell Assembly, an FM Indicator and a Pressure Unit for applying the pressure to the medium in the Viscometer Cell Assembly. The Pressure Unit is connected to supply the pressure gas to the Viscometer Cell Assembly through a tubular conductor 21. The output of the Viscometer Cell Assembly is supplied to the FM Indicator which provides an indication of the viscosity measurements carried out with the Viscometer Cell Assembly.

Typically, the pressure is applied to the medium whose viscosity is to be measured by compressing an inert gas such as argon; helium or gases such as carbon dioxide or nitrogen may also be used. For pressures up to 2 kilobars dry argon is compressed by a mechanical compressor 23. For pressures above 2 kilobars precompressed and preliquefied argon is used. The argon is supplied from the compressor 23 to the tube 21 through a three-way coupling 25, through a valve 27 and through a coupling 29. The Pressure Unit also includes a bomb or tank 31 of argon which is maintained liquefied by Dewar flask 33 containing liquid nitrogen or other refrigerant. This tank is connected through a coupling 35, a valve 37 and the coupling 29 to the tube 21. A pressure gauge 41 is provided to indicate the pressures of the gas impressed on the liquid in the container.

Before the pressure is transmitted through the tube 21 the valves 27 and 37 connecting the mechanical compressor 23 and liquefied argon bomb 31 to the Viscometer Cell Assembly are closed and a valve 39 between the coupling 25 and the coupling 35 is opened and argon is supplied to the bomb 31 under pressure and becomes liquefied by cooling with liquid nitrogen. The valve 39 is then closed and remains closed during the remainder of the operation. When the pressure from gasification and thermal expansion of the liquefied argon by heater 40 is to be compressed the valve 27 is closed and the valve 37 between the coupling 35 to the tank 31 and the coupling 29 to the Viscometer Cell Assembly is opened.

Figure 3A:
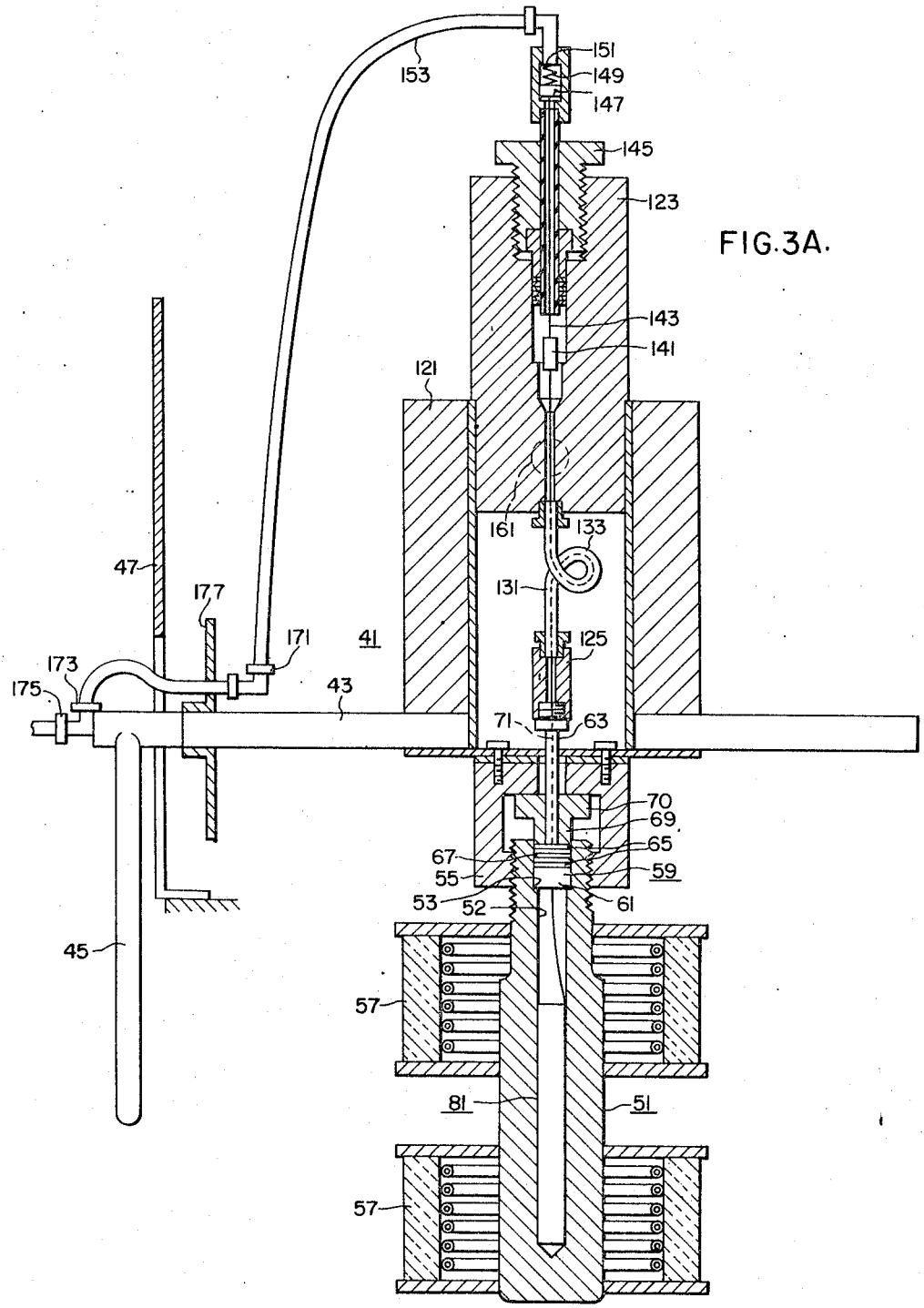
FIG. 3A is a view in transversse section showing the Viscometer Cell Assembly in accordance with this invention.
Figure 3B:
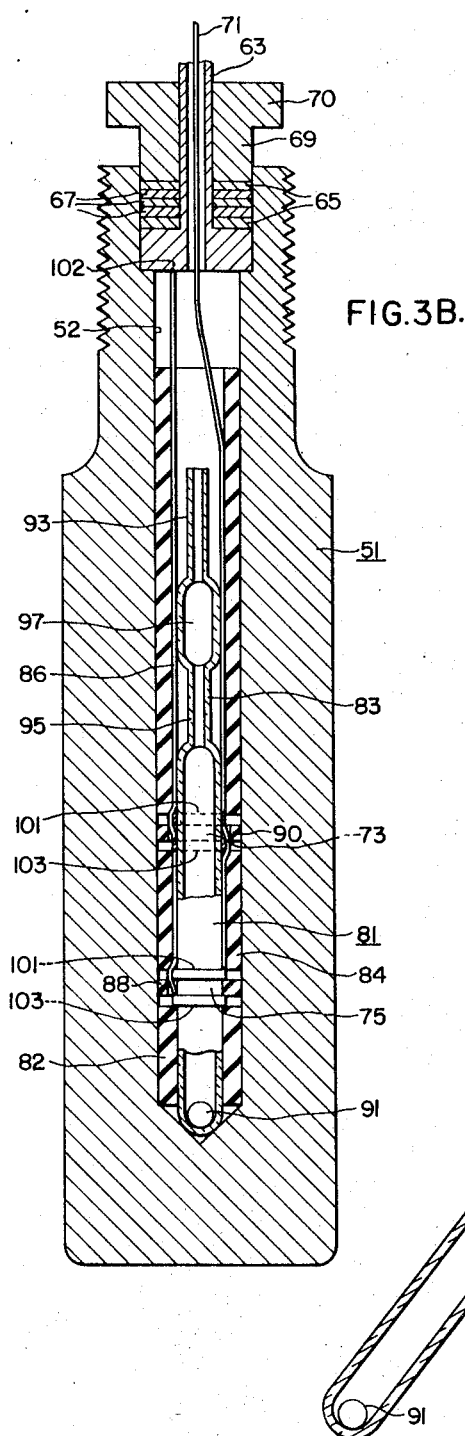
FIG. 3B is a view in transversse section enlarged showing the viscometer cell of the Assembly shown in FIG. 3A.

The Viscometer Cell Assembly includes a viscometer cell mounting 41 (FIGS. 1 and 3) supported on a shaft 43 which is rotatable by a handle 45 connected to the shaft so that the angle of inclination of the support to the horizontal may be reversed. The position of the handle 45 may be referred to as a circular scale 47. In the practice of this invention the handle 45 may be set at a position on the scale 47 corresponding to a predetermined angle above the horizontal and may be moved to a position a predetermined angle below the horizontal. Preferably, these angles should be equal.

A high pressure bomb 51, typically composed of Hynes Stellite No. 25 alloy, is suspended from the support 41. Typically, the bomb may be two inches in diameter and ten inches long. Stellite 25 is a cobalt alloy having the following typical composition:

| | Percent |
|---|---|
| Cobalt | 51 |
| Chromium | 20 |
| Tungsten | 15 |
| Nickel | 10 |

The bomb 51 is provided witht an externally threaded stem 53 and is supported from a cap nut 55 secured to the shaft 43. The bomb is encircled by heating coils 57 which maintain the temperature therein at a predetermined magnitude. The bomb 51 has a bore 52, typically of about one-half inch in diameter, which has a shoulder in the stem 53 above which there is a modified Bridgman high-pressure seal 59. The seal includes a piston 61 having a long stem 63; the piston 61 is compressed over the opening in the bore. Gaskets including end brass washers 65 between which a plurality of silver washers 67 are interposed are provided. These washers are held in position by a thrust washer 69 having a flange 70. The piston stem 63 passes through the washers 65, 67 and 69. The piston has an opening through which an electrical conductor 71, for connection to the capacitive components 73 and 75 (see FIG. 3B) and for transmitting the compressing gas, passes.

The viscometer cell 81 (FIG. 3A) which is disposed within an array of insulating sleeves and rings 82, 84, 86 and 88 and 90 respectively in the bore in the bomb 51 includes a tube 83 of fused quartz. The sleeves 82 through 86 and the rings 88 and 90 are grooved so that the conductor 71 may pass along them. The conductor 71 is enclosed in an insulating sleeve. The outside diameter of the quartz tube 83 is such that the quartz tube readily slips into the sleeves and rings 82 through 90. The inside diameter of the quartz tube 83 is precisely dimensioned and, in a typical situation, may be .2805 inch. Within the quartz tube there is a precision-ground ball 91. The ball may typically have a diameter of .2500 inch so that it is movable under gravity in the medium under test and is not interfered with by the walls of the quartz tube. Typically, the ball 91 is composed of Hastelloy C alloy which is a nickel alloy having essentially the following compositions:

| | Percent |
|---|---|
| Nickel | 55 |
| Molydenum | 17 |
| Chromium | 16 |
| Iron | 5 |
| Tungsten | 4 |

With the Viscometer Cell Assembly in any inclined position the ball 91 is at one base or the other of the quartz tube 83. In the setting shown in FIG. 3B the ball is at the base of the quartz tube remote from the seal 59.

The quartz tube 83 has capillary sections 93 and 95 separated by a section 97 of the greater diameter. The intermediate section 97 serves as a reservoir for the liquid in the quartz tube 83.

Figure 2:
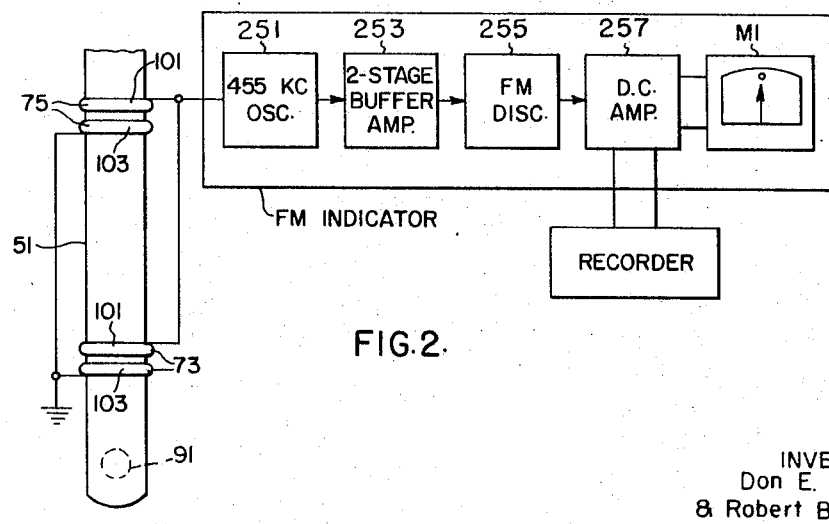
FIG. 2 is a view partly diagrammatic and partly in block diagram showing the FM Indicator and its relationship to the viscometer cell in apparatus according to my invention.

On the outside of the quartz tube 83 the capacitive components 73 and 75 in the form of pairs of ring shaped electrodes spaced along the tube are provided. Typically, the distance between the pairs of electrodes 73 and 75 may be of the order of one inch. Each pair of ring shaped electrodes 73 and 75 consists of a pair of conducting rings 101 and 103 (FIG. 2) insulated and spaced a predetermined short distance from each other by the rings 88 and 90; this distance between rings 101 and 103 should be so short that it is spanned by the ball 91 as the ball rolls through the medium. The rings of the capacitive elements are composed of Nichrome alloy. Each pair of electrodes 101 and 103 serves as a capacitive impedance 73 and 75 respectively and the capacitive impedances are connected in parallel. One ring 101 of each pair is connected to a corresponding ring 101 of the other pair and the common junction is connected to the input of the FM Indicator through the conductor 71. The other rings 103 of each pair are connected together and grounded to the bomb 51 through terminal 102. The rings 101 and 103 are here connected in parallel; they could be connected in series.

Figure 6:
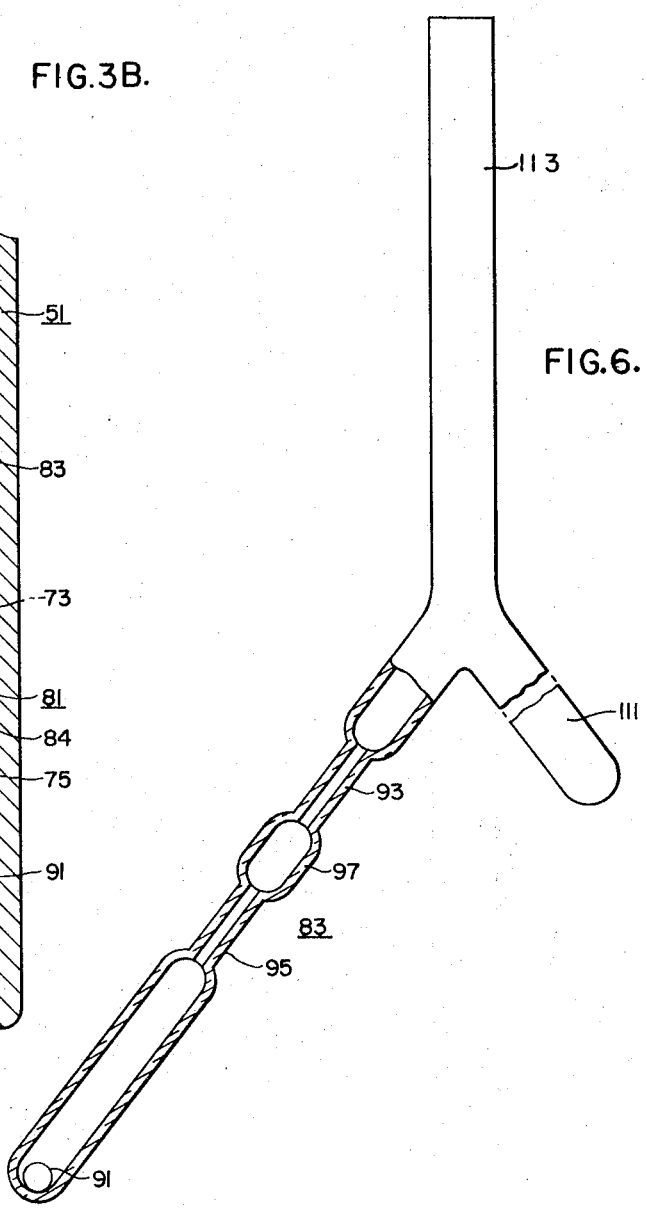
FIG. 6 is a view in side elevation showing the viscometer cell as part of apparatus used in filling the cell with a liquid whosse viscosity is to be measured.

The specimen is deposited in the viscometer cell 81 with the apparatus shown in FIG. 6. This apparatus is a Y shaped tubular structure of fused quartz one arm of which is the tube 83 of the viscometer cell 81 with the ball 91 in it and the other arm of which is a tube 111 which contains the specimen usually a liquid. The stem 113 of this structure is connected to a pump (not shown) and the interior of the structure is evacuated. Then the structure is turned so that the liquid flows into the cell tube 83. Pressure may be applied to force the liquid through the capillaries 93 and 95. The viscometer cell tube 83 is then severed from the remainder of the Y shaped structure and inserted in the bore 52 in the bomb 51.

The Viscometer Cell Assembly also includes a bracket 121 secured to the shaft 43 to which a cylinder 123 is secured. Within the bracket 121 a high-pressure connector 125 is provided. This connector 125 provides a path for the conductor 71 connected to the capacitive rings 73 and 75 and for the compression gas. From the stem 63 of the seal piston the high-pressure connector is connected to a cable 131 including a conductor 133 and providing a path for the flow of the compression gas. This cable 131 has a loop to provide a resilient connection to the viscometer cell 81 through the seal 59 and passes through a bore in the cylinder 123 to a conducting block 141 which is connected to a drill rod 143 passing through the piston of a second modified Bridgman seal 145. The drill rod is in turn connected to a second block 147 which in turn is connected through a spring 149 to the center conductor 151 of a coaxial cable 153. The cylinder 123 is provided with a transverse opening 161 within which there is a nipple (not shown) connected to the gas conductor (not shown) from the Pressure Unit. This opening 161 is connected to the looped conductor 133 and supplies a gas through the looped tubing through the high pressure connector 125, the central opening in the piston 61 of the Bridgman seal 59, and the capillary openings 93 and 95 to the medium in the viscometer cell 81. The coaxial conductor 153 extends from the block 147, where its center conductor 151 is connected to the drill rod 143, through a right-angle connector 171 to a second right-angle connector 173 and thence to the input to the FM Indicator. The output connection from the second right-angle connector 173 is a movable joint 175, the outer conductor of this connection being movable and the center conductor remaining fixed. The coaxial conductor is held by a bracket 177 so that it remains fixed and does not twist or become displaced relative to the housing 41 of the Viscometer Cell Assembly and thus introduce inaccuracies in the measurement.

In the practice of this invention the Viscometer Cell Assembly is set in a first setting with a ball 91 at one extreme position. The Assembly is then moved to a second setting in which the ball rolls from the first position to the lower extreme position. It is necessary that the time of movement of the ball 91 over a predetermined distance be measured and this measurement is effected by observing the signals produced as the ball passes through the successive capacitive rings 75 and 73. This time can only be precisely determined if the ball 91 moves at a constant velocity between these rings. One of the advantages of this invention is that the rings 101 and 103 are near to each other so that the signal produced as the ball 91 passes through each set of rings in its stem is relatively sharp.

Figure 9:
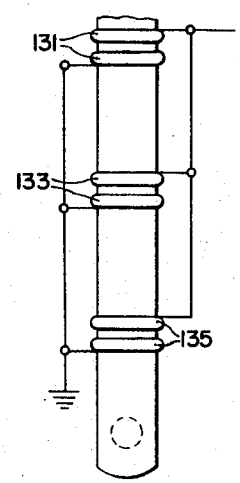
FIG. 9 is a fragmental view in side elevation illustrating a modification of this invention.

The precise determination of the time interval requires that the ball 91 move at a constant velocity between the two sets of rings. The initial velocity of the ball is zero and the ball is accelerated by gravity to a constant terminal velocity which is achieved because of the resistance effect of the medium. It is essential that in passing through pairs of rings 73 and 75 the ball be at its terminal velocity. In the practice of this invention it has been found that the velocity of the ball between the two rings is usually the terminal velocity and is substantially constant. For operations in which the terminal velocity may not be reached a viscometer cell as shown in FIG. 9 may be provided. In this case there are three sets of rings 131, 133, 135 and the three sets of rings are all connected in parallel to the FM Indicator. A determination may be made as to whether or not the terminal velocity has been reached by determining the time taken for the ball 91 to move from the first set of rings, say, 131 to the second set of rings 133 and from the second set of rings 133 to the third set of rings 135. If the velocity is constant the time in each case would be proportional to the distance between the sets of rings passed by the ball.

Figure 4:
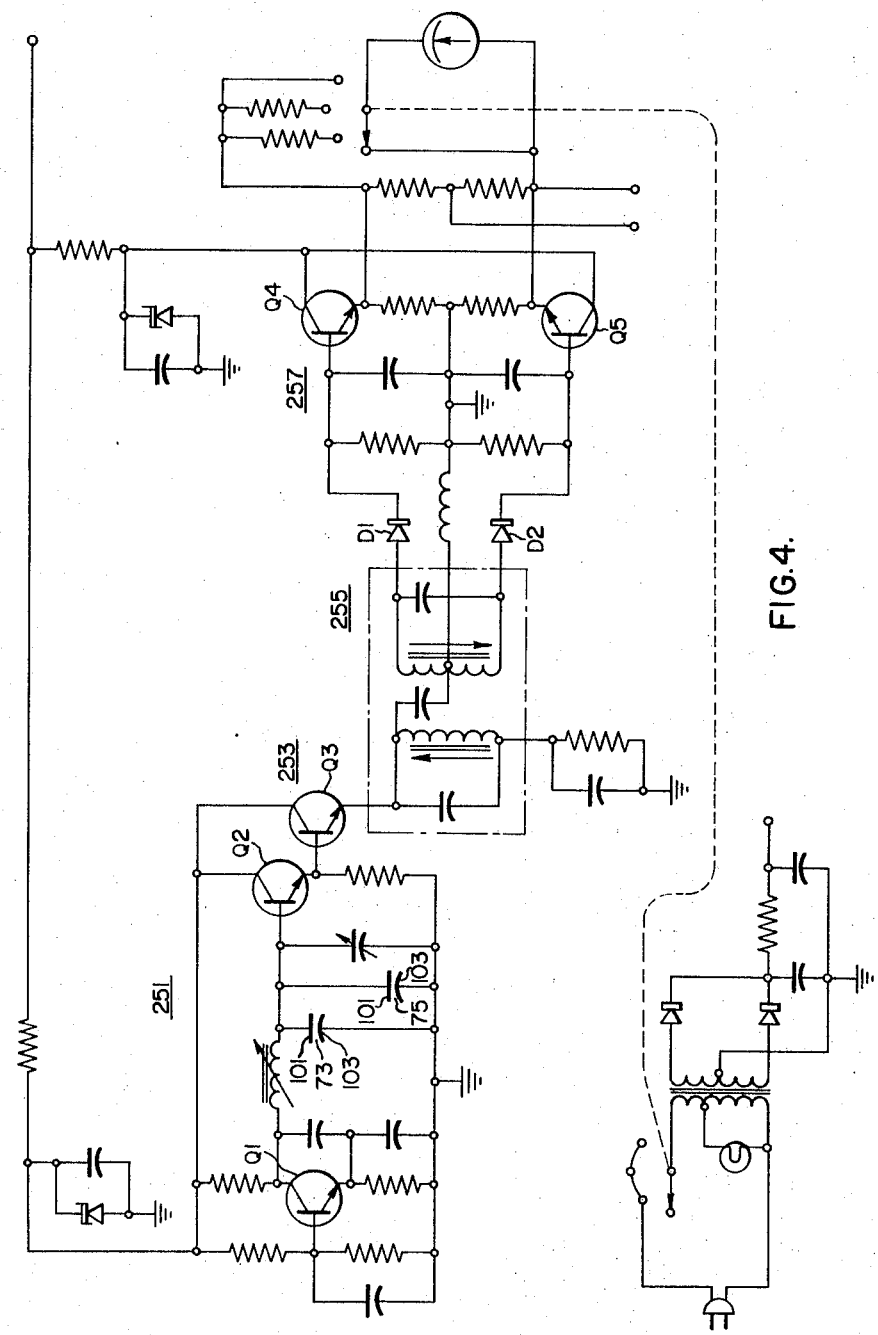
FIG. 4 is a schematic showing the FM Indicator in apparatus according to this invention.

The FM Indicator (FIGS. 2 and 4) includes an oscillator 251 including the transistor Q1 and associated circuit elements. Typically the oscillator 251 may be set to operate at a frequency of 455 kilocycles per second. This Indicator also includes a two stage buffer amplifier 253 which includes the transistors Q2 and Q3. In addition there is a discriminator 255 which includes the diodes D1 and D2 and a push-pull direct current amplifier 257 which includes the transistors Q4 and Q5. The output of the DC amplifier is supplied to a microammeter M1 and another output is supplied to a recorder.

In the use of this apparatus the FM Indicator is initially set so the microammeter M1 reads zero. With the viscometer cell 81 in one setting and the ball 91 in the extreme position the output of the DC amplifier is substantially zero and the recorder is in zero setting. The movement of the ball 91 through each of the ring capacitors 73 and 75 produces a change in the frequency of the oscillator 251 which is discriminated by the discriminator 255 and produces a pulse at the output of the DC amplifier 257. This pulse appears as a pip on the recorder (not shown). The time taken for the ball 91 to move between the two ring capacitors 73 and 75 is then determined by measuring the distance between the pips on the recorder tape.

In determining viscosity it is essential that any gas bubbles be removed from the liquid. This object is readily accomplished with the apparatus disclosed. Since the ball 91 is electrically conducting and the bubbles contain a gas, the capacity of impedance of the pairs of rings is increased when the ball passes through the rings 73 or 75 and decreased when the bubbles passes through the rings. The output of the discriminator 255 then is of opposite polarity for the ball than for the bubbles.

Figure 7:
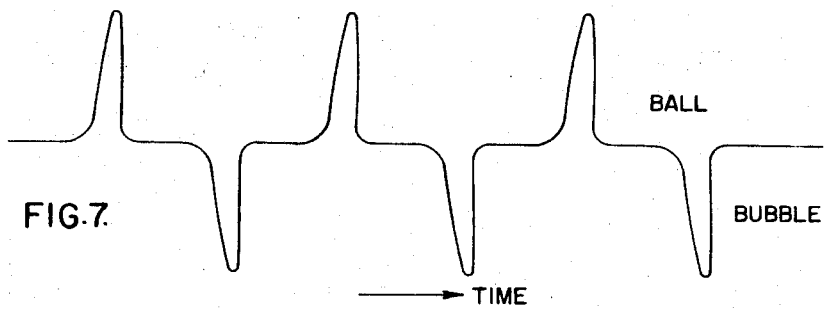
FIG. 7 is a graph illustrating the operation of the apparatus according to this invention.

This is illustrated in FIG. 7 in which the discriminator 255 output is plotted vertically as a function of time for a typical set of measurements. It is seen that the pips for the ball 91 are vertically upward and the pips for the bubble are vertically downward. In the use of the apparatus the operator can carry out an operation and observe if there are any pips corresponding to the bubbles; if there are bubbles, the system can be evacuated until the bubbles are removed.

For precise measurement it is desirable that corrections be introduced for the compression of the medium under the pressure applied and under certain circumstances for the compression of the ball. The correction terms can be derived by taking the logarithmic derivative of the equation for $\eta$ which gives $$\frac{d(\eta)}{\eta} = \frac{dA}{A} + \left(\frac{1}{1-\rho_l/\rho_b}\right)\frac{d(\rho_b)}{\rho_b} - \frac{1}{\rho_b/\rho_l - 1}\frac{d(\rho_l)}{\rho_l}$$

where $$\frac{dA}{A} = -\frac{2}{3}[(R^2\beta_t - r^2\beta_b)/R^2 - r^2]\Delta P$$

and where R, r and $\beta_t$, $\beta_b$ are the radii and compressibilities of the tube and ball, respectively, and $\Delta P$ is the pressure difference.

In typical use of the apparatus the viscosity of glycerol was determined over a wide pressure range. This determination served to evaluate the precision of the apparatus because Bridgman had made a like determination (P. W. Bridgman, "Collected Experimental Papers," vol. IV, Harvard University Press, 1964, page 93-2541). The measurements were made at 75° C. The results are presented in Tables I and II.

In deriving this data it was necessary to know the density of the glycerol and the density of the ball. The density at 75° C. for the glycerol is 1.2264 grams per cubic centimeter. For the ball composed of a Hastelloy C the density is 8.94 grams per cubic centimeter. In Table I the value of $\beta$, the factor which measures the compressibility of the glycerol, at 75° C. is presented as a function of the pressure. It is unnecessary to take into consideration the compressibility of the ball.

TABLE I

| Pressure | | $\Delta V/V$ (75° C.)* | $\beta$ (75° C.) |
|---|---|---|---|
| (kbars) | (kg./cm.²) | | |
| 0.981 | 1,000 | 0.0258 | 2.63×10⁻⁵ (bar⁻¹) |
| 1.96 | 2,000 | .0453 | 2.31 |
| 2.94 | 3,000 | .0608 | 2.07 |
| 3.92 | 4,000 | .0751 | 1.91 |
| 4.80 | 5,000 | .0876 | 1.82 |

*From P.W. Bridgman

In Table II the viscosity is presented as a function of pressure both uncorrected for the compression of the glycerol and corrected.

TABLE II

| Pressure | | Viscosity (poise) | | Temperature (° C.) |
|---|---|---|---|---|
| (kbars) | (kg./cm.²) | Uncorrected | Corrected | |
| 0.001 | 1 | 0.407 | 0.407 | 75 |
| 0.667 | 680 | 0.565 | 0.565 | |
| 1.34 | 1,360 | 0.759 | 0.750 | |
| 2.02 | 2,060 | 1.11 | 1.09 | |
| 2.69 | 2,740 | 1,49 | 1,45 | |
| 3.26 | 3,320 | 2.06 | 2.00 | |
| 3.93 | 4,010 | 2.86 | 2.77 | |
| 4.86 | 4,950 | 4.29 | 4.13 | |

Figure 8:
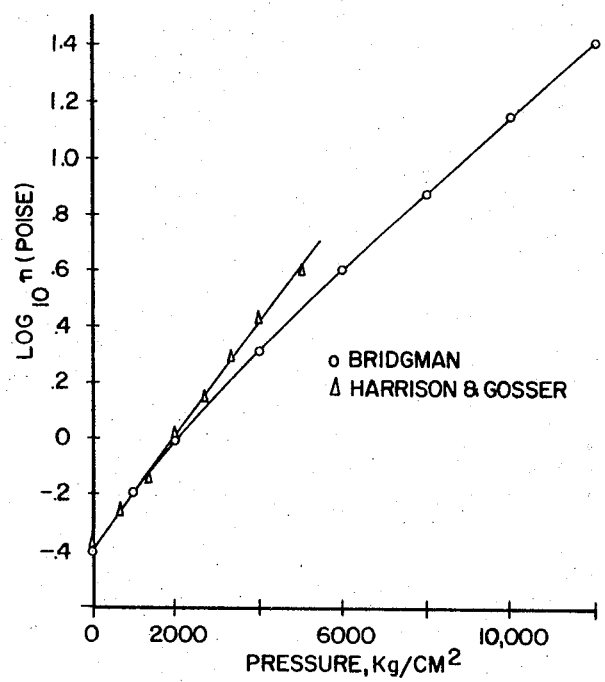
FIG. 8 is a graph showing the relationship between the data derived in the practice of this invention and data derived at an earlier date with prior art apparatus.

FIGURE 8 is a plot of the $\log_{10}$ of viscosity in poise as a function of pressure. The triangles on FIG. 8 are the points derived in the practice of this invention and the circles are those derived by Bridgman. It is seen that the graph derived in the practice of this invention is sharply linear while Bridgman's graph is curved. Since there is no reason for the curvature in Bridgman's graph, the data derived in the practice of this invention appears to be more precise than Bridgman's data.

For convenience the following summary of the description of the invention is presented.

This invention relates to a rolling-ball viscometer for use at pressures as high as 5 kilobars and temperatures as high as 400° C. The rolling-ball-viscometer technique at high pressures requires the solution of two problems (1) the coupling of the liquid or other medium to the pressure, and (2) the precise measurement of the roll time of the ball 91.

The specimen whose viscosity is to be measured is coupled with the pressure medium (typically argon) through capillaries 93 and 95. The viscometer cell 81 is typically comprised of fused silica tubing, precision bored typically to a 0.2805 inch diameter and fitted with a precision ground typically 0.2500 inch diameter ball 91. One end of the 2½ inch long cell is sealed and the other end is joined to a 1 mm. bore capillary which also contains an expansion reservoir 97. The overall length of the viscometer cell is 4½ inch. If it is desirable to prevent mixing of the pressure medium with the specimen whose viscosity is to be measured, the capillary end of the cell 81 can be fitted with a metal bellows (not shown).

Roll time is measured by observing the output on a strip chart recorder fed by an FM Indicator which can detect the ball 91 when it rolls between sets of ring-shaped capacitive electrodes 73 and 75 spaced about one inch apart along the outside of the viscometer cell 81.

The FM proximity Indicator sensor consists of pairs of ring-shaped electrodes 101 and 103 through which the moving ball travels. Each pair of ring-shaped electrodes constitute a small capacitor the value of which is modulated by the presence of the ball. Proper choice of the relative dielectric constants (a conductor may be regarded as having dielectric constant infinity) between the moving object and the media normally making up the dielectric of the ring capacitors 73 and 75 results in the largest practicable signal.

This apparatus has marked advantages, in the measurement of the velocity of a moving object in fluids and particularly in a high-temperature falling ball viscometer, over inductors which present turn-to-turn insulation problems and the sensitivity (Q) of which changes with temperature. If highly corrosive fluids are to be studied a very inert material such as quartz may be used as the falling ball.

Since the value of $\Delta C$ appearing at a ring capacitor 73 and 75 is usually small an FM null indicator consisting of a stable tunable oscillator 251 and a narrow band FM discriminator 255 is used to monitor the changes in the ring capacitors. Specifically the FM Indicator consists of a stable tunable oscillator 251, and a two stage buffer amplifier 253 between the oscillator and the narrow-band FM discriminator 255. The discriminator 255 includes diodes D1 and D2 for rectification and the output is displayed on meter M1 after additional amplification by amplifier 257. A 10 millivolt recorder output is also provided.

The Viscometer Cell Assembly incorporates a high-pressure bomb and seal. The cell is inside of a ½ inch bore high-pressure bomb (typically 2 inch diameter x 10 inch long) made of Hynes Stellite No. 25 and closed by a modified Bridgman seal. A five-inch-long temperature zone inside the bomb is maintained constant to within ±1° C. by external heaters 57. Temperature calibration of the cell 81 is made under atmospheric pressure: no provision is made for monitoring the internal bomb temperature at higher pressures. Temperature reproducibility and stability is demonstrated by the agreement of the viscosity data taken from separate determinations and the consistency of the data taken from day to day on the same determinations.

Pressures up to 2 kilobars are generated by mechanial compression of dry argon. Higher pressures were achieved through use of a thermal intensifier. Dry argon gas is condensed in bomb 31 by cooling it to liquid nitrogen temperature and pressurizing the system to 2 kilobars. Gasification and thermal expansion of the argon creates pressures up to 5 kilobars in the viscometer cell 81. The viscometer is free to rock during measurement because it is coupled to the high pressure system by means of flexible tubing. Typically, a Bourdon tube pressure gauge is used to monitor the pressure.

The Viscometer Cell Assembly is suitable for measurement of viscosities between 1–2000 centipoise of media which have resistivities greater than about $10^6$ ohm/cm.

Lower resistivities effect the precision with which the roll time can be measured. An advantage of the FM Indicator is that the sensitivity is unaffected by either temperature or pressure and that either a metal or ceramic ball can be used.

While preferred embodiments of this invention are disclosed herein, many modifications thereof are feasible. This invention then is not to be restricted except insofar as is necessitated by the spirit of the prior art.

We claim as our invention:

1. A rolling ball viscometer for determining the viscosity of a medium including a tube having said medium therein and having an object movable therein through said medium under gravity between first and second positions of said tube, means mounting said tube for motion between a first setting in which said object is movable from said first position to said second position and a second setting in which said object is movable from said second position to said first position, means interposed between said first and second positions for indicating the time of movement of said object between said positions, means connected to said tube for applying pressure to said medium, and a capillary in said tube connected to said pressure-applying means for transmitting said pressure to said medium while preventing escape of said medium from said tube during said motion of said tube.

2. The viscometer of claim 1 wherein the indicating means includes capacitive means which varies in capacitance in dependence upon the nearness of the object to said capacitive means and also wherein said object is of a material such that said capacitance is higher the nearer said object is to said capacitive means.

3. A rolling ball viscometer for determining the viscosity of a medium including a tube having said medium therein and having an object movable therein through said medium under gravity between first and second positions of said tube, means mounting said tube for motion between a first setting in which said object is movable from said first position to said second position and a second setting in which said object is movable from said second position to said first position, a frequency-modulation circuit including an oscillator operating at a predetermined frequency and a frequency discriminator connected in discriminating relationship with said oscillator, electrical impedance components connected in frequency changing relationship with said oscillator and interposed between said first and second positions so that said object is electrically coupled to each said impedance component in its turn as it moves between said first position and said second position while so coupled changing the frequency of said oscillator, and means connected to said discriminator responsive to each occurrence of said change in frequency to indicate the time taken by said object to move from one component to the other.

4. The viscometer of claim 3 wherein the impedance components are ring capacitors through which the object passes as it moves between the first and second positions.

5. The viscometer of claim 3 wherein the impedance components are ring capacitors through which the object passes as it moves between the first and second positions, each capacitor including a plurality of rings between which said object passes, said rings being spaced so that said object spans said rings as it passes between them.

6. A viscometer for determining the viscosity of a liquid including a tube for receiving said liquid, a moving object disposed in and movable through said tube, means mounting said tube in a setting wherein said object is movable in a path from a first position to a second position, timing means interposed between said first and second positions for indicating the time of movement of said object between said positions, and pressure means connected to said tube for applying pressure to a liquid contained in the tube, said tube having a capillary portion between said path and said pressure means for transmitting said pressure while impeding movement therethrough of liquid contained in said tube.

7. A viscometer as claimed in claim 6 wherein said tube including the capillary portion and the portion defining said paths are constructed integrally of quartz.

8. A viscometer as claimed in claim 6 wherein said pressure means comprises a compressor unit, a liquified-gas bomb unit for developing pressure, and valve means selectively operable for connecting each of said units to pressurize said tube.

9. A viscometer as claimed in claim 6 wherein said timing means comprises first means for establishing a first capacitor at said first position with the contents of said tube at said first position acting as a dielectric, second means for establishing a second capacitor at said second position with the contents of said tube at said second position acting as a dielectric, said object being constructed to increase the capacitance of each of said capacitors as it passes adjacent thereto.

10. A viscometer as claimed in claim 9 wherein said timing means comprises means for presenting a first indication for each increase in capacitance of one of the capacitors and a second indication for each decrease in capacitance of one of the capacitors.

11. A viscometer as claimed in claim 9 wherein said capillary portion comprises two capillary sections in series separated by a section of greater cross-section.

12. A viscometer as claimed in claim 9, said timing means comprising means for presenting a first indication for each increase in capacitance of one of the capacitors and a second indication for each decrease in capacitance of one of the capacitors, said tube having a third position on said path spaced from the first and second positions, means for establishing a third capacitor at said third position with the contents of said tube at said third position acting as a dielectric, said timing means being effective for presenting said indications in response to changes in the capacitance of the third capacitor.

References Cited

UNITED STATES PATENTS

| 2,320,218 | 5/1943 | Buckley | 73—57 |
| 2,388,387 | 11/1945 | Cohen | 73—57 |
| 3,026,716 | 3/1962 | Connally | 73—57 |
| 3,240,053 | 3/1966 | Jones | 73—57 |

FOREIGN PATENTS 130,690  1960  U.S.S.R.

DAVID SCHONBERG, *Primary Examiner.*